Oct. 31, 1961   R. B. COOPER ET AL   3,006,403
METHOD OF FABRICATING HEAT REFLECTING AND INSULATING
MATERIAL AND PRODUCT RESULTING FROM SAID METHOD
Filed Oct. 8, 1957
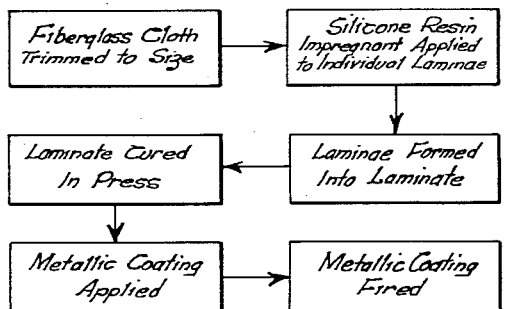
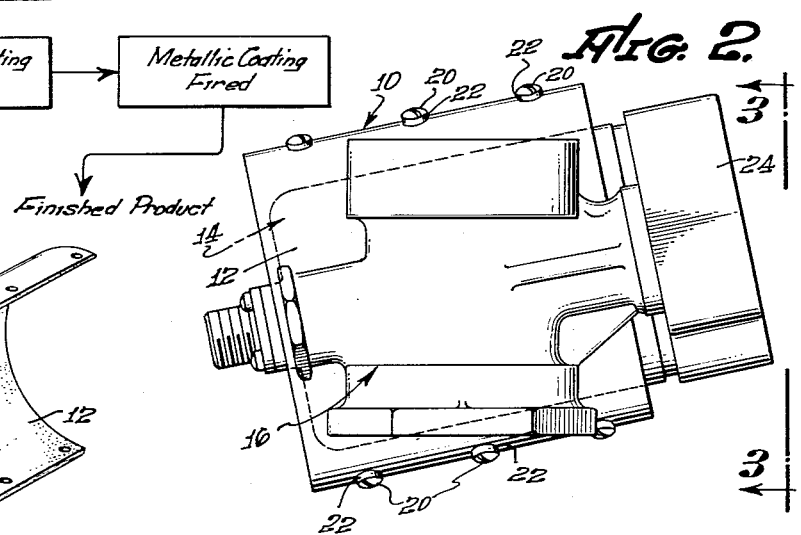
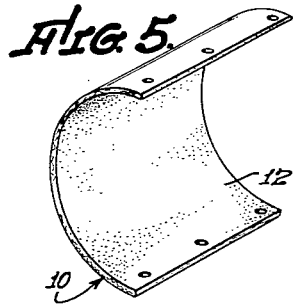
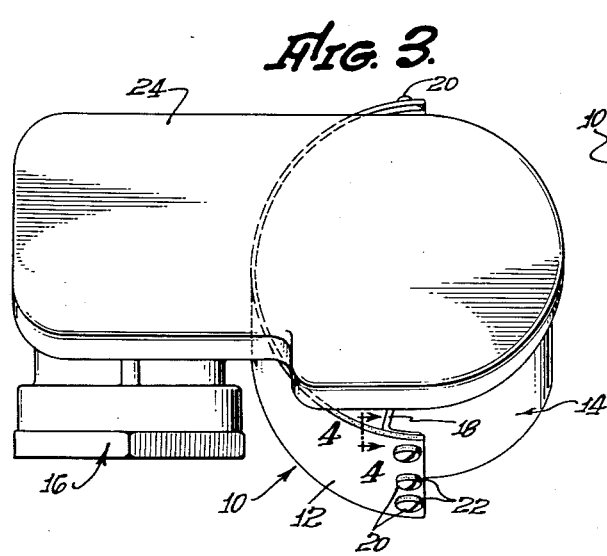
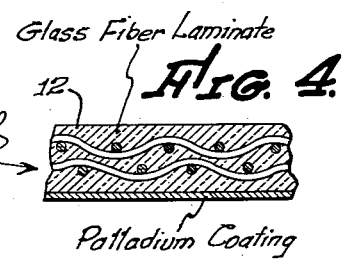
INVENTORS
ROYDON B. COOPER,
BY Thomas P. Mahoney
ATTORNEY.

United States Patent Office 3,006,403
Patented Oct. 31, 1961

3,006,403
METHOD OF FABRICATING HEAT REFLECTING AND INSULATING MATERIAL AND PRODUCT RESULTING FROM SAID METHOD
Roydon B. Cooper, Sunland, and Andrew H. Malinovszky, Huntington Park, Calif., assignors, by mesne assignments, to Barrier, Inc., West Los Angeles, Calif., a corporation of California
Filed Oct. 8, 1957, Ser. No. 689,008
10 Claims. (Cl. 154—44)

This invention relates to a heat reflective and insulating material and to the method of fabricating the same. The material is constituted, essentially, by a base composed of a thermosetting plastic impregnated material, preferably plastic impregnated glass fiber, having deposited thereupon a highly reflective coating of a metal drawn from among the noble metals and including such metals as gold, silver, platinum, palladium, rhodium, and iridium.

One of the major problems encountered in the aircraft and other industries at the present time is the difficulty encountered in adequately thermally isolating operating mechanisms from ducts carrying high temperature gases where the radiant energy emanating from said ducts would cause the premature failure of said mechanisms. For instance, it is now common practice to pass heated air at 850° F. through ducts in an aircraft and it is necessary, of course, to isolate the electrical or other actuators for the valves controlling the flow of heated air through said ducts in order to avoid the premature failure thereof.

However, since the space requirements are quite stringent and the weight requirements are also extremely critical, the usual insulating batts or polished metal heat reflecting shields previously adopted to handle such problems have been found to be unsatisfactory.

Furthermore, the supersonic speeds attainable by present-day military aircraft result in high skin temperatures which indicate the use of other skin materials rather than the aluminum and stainless steel currently utilized. Plastic laminates have been tried and found to be infeasible because of the erosion of the surfaces thereof resulting from skin friction at high speeds.

This present application is a continuation-in-part application of copending application of Roydon B. Cooper, Serial No. 536,330, filed September 6, 1955, entitled "Method of Fabricating Heat Reflecting and Insulating Material and Product Resulting from said Method" and now abandoned.

It is, therefore, an object of our invention to provide a thermoreflective and insulating material which includes a base formed from a plastic impregnated fiber laminate and having deposited upon one or more surfaces thereof a reflective coating constituted by a metallic deposit drawn from the noble metals such as gold, silver, platinum, palladium, rhodium, and iridium. Such a material is light in weight and of minimal thickness, thus making it particularly useful in aircraft insulating applications. Moreover, the provision of a tenacious metallic coating on the surface thereof permits the material to be utilized in structural applications in aircraft since said coating will resist erosion, pitting, and the like.

The laminate, as disclosed hereinbelow, consists of a plurality of layers of fibrous material, and said layers may include various types of organic and inorganic fibers.

Another object of our invention is the provision of a thermoreflective material of the aforementioned character wherein the base is constituted by a fiber laminate which is impregnated with a thermosetting plastic material.

An additional object of our invention is the provision of a thermoreflective, heat insulating material constituted by a laminate of the aforementioned character which can be readily shaped prior to the deposition upon one or more surfaces thereof of the aforementioned reflective metallic coating.

A further object of our invention is the provision of a method of fabricating the aforementioned thermoreflective material whereby the base is fabricated and contoured to the desired shape and whereby, subsequently to the achievement of the desired shape, the reflective metallic coating is deposited thereupon. Subsequently to the deposition of the metallic coating, the metallic coated surface is fired to create a homogeneous bond between the reflective metallic coating and the surface of the insulating body to which it has been applied.

If necessary to prevent the firing process from causing deterioration of the plastic impregnated base upon which the metallic coating has been deposited, the surface which is the reverse of that upon which the metallic coating has been previously deposited may be subjected to a cooling treatment to prevent the aforementioned deterioration of the plastic impregnated base during the firing process.

Other objects and advantages of our invention, as incorporated in a specific embodiment thereof, will be apparent from the following specification and the accompanying drawing which is for the purpose of illustration only and in which:

FIG. 1 is a sequence diagram showing the basic steps of the method of our invention;

FIG. 2 is a front elevational view showing a thermoreflective shield constructed in accordance with the teachings of our invention mounted on a valve actuator;

FIG. 3 is a rear elevational view of the assembly shown in FIG. 2;

FIG. 4 is an enlarged, fragmentary, sectional view taken on the broken line 4—4 of FIG. 3; and FIG. 5 is a perspective view of the thermoreflective shield.

Considering first the method of fabricating the thermoreflective and insulating material and product of our invention, we utilize a plurality of laminae formed from fiber cloth and impregnated with a plastic impregnant of the thermosetting resin type. The laminae are then formed into a laminate which is placed in a heated die of the desired configuration and a shape such as the half cylinder 10, as shown in FIGS. 2 and 3 of the drawing, is created. Instead of utilizing the woven glass fiber cloth mentioned hereinabove it is, of course, feasible to utilize laminae constituted by matted fibers of glass or other material and it is not intended that the laminae be limited to woven fabric.

The half cylinder 10 is utilized as a heat protective shield 12 for the side of an electric actuator 14 for a valve 16 which is juxtaposed to a hot air duct in an aircraft. The shield 12 is mounted in spaced relationship with the exterior of the actuator 14 by means of brackets 18 secured to the housing of said actuator. Fasteners 20 secure the shield 12 to the brackets 18 and insulating washers 22 formed from silicone plastic, or other insulating material, materially reduce heat conduction through the brackets 18 into the shield 12. It will be noted that a transmission housing 24 forms the connection between the valve 16 and the actuator 14. The configured shapes of the shields are usually formed with an interior capacity which is slightly larger than the exterior size of the object which is to be shielded to establish a protective air circulation space between the object and the thermally reflecting insulating shield.

The formation of the shaped body from the thermo-insulating material provides a base upon which a highly reflective coating drawn from the class of metals consisting of gold, silver, platinum, palladium, rhodium, and iridium can be deposited. The exact method utilized to deposit the metallic coating has not been found to be critical since success has been encountered with oil suspensions of the various metals incorporating various types of fluxes such as ceramic frits, lead borate, or the like.

In order to fix and stabilize the intermediate stage, deposited coating of the selected metal as a continuous, tenacious metallic film, the coated body is fired to produce a hard, highly reflective, dense and corrosion resistant finish which is characterized by its resistance to crazing, flaking, and peeling. Prior to firing, in the oil suspension process, the metal and oil coating can be washed or rubbed off readily. The firing process apparently fuses the finely divided metal particles together into a very thin, nonporous, continuous coating and, at the same time, makes them adhere strongly to the laminate base. It is probable that the metal enters into the minute porosities of the resin of the laminatinate. Also, it is quite conceivable that there may be a mechanical and chemical bonding effect at the molecular level. While the firing can be accomplished in a variety of ways, we have found that the heating of the metallic coating by the use of radiant heating means is quite effective.

During the firing process, the coated laminate may be disposed upon a cooling envelope or tube whose external diameter is the same as the internal diameter of the body and which is adapted to conduct heat away from the body during the firing process by the expedient of circulating a cooling medium therethrough. Cooling of the curved or otherwise shaped laminates during the firing process is sometimes required so that the laminates will not be artificially aged or embrittled by the heat resulting from the firing process and will retain its desired mechanical properties.

After the completion of the firing process, the body constituted by the thermoreflective material of our invention is ready for use and can be placed in its intended environment with no further processing.

One of the characteristic advantages of our invention is the ease with which the laminate can be configured into relatively complex shapes. This desired result is achieved because of the fact that the efficiency of the metallic coating requires only a relatively thin, mechanically satisfactory base and there is only partial dependence upon the fiber cloth laminate for its heat resisting and insulating capacity. Of course, the thinness of the thermally reflective, heat insulating material also facilitates the use of our material in confined spaces where weight requirements are extremely stringent, as in aircraft.

While glass fiber cloth laminates have been found to be most satisfactory as a base for the deposit of metallic coating, we do not intend to limit our invention thereto since it is possible to utilize other laminating cloths. However, for high temperature and high strength applications, the glass cloths are the most satisfactory and economical materials presently available.

Indicative of the results achieved by our invention is the fact that, in several tests where a laminate constructed of glass fiber cloth with a silicone resin impregnant was subjected to heat, directly or indirectly, without the matured coating of metal, breakdown of the laminate was apparent immediately at temperatures in the range of 950° F. to 1050° F. However, when the laminate was coated with the unfused metallic suspension as set forth hereinabove and slowly subjected to the heat, the metallic coating would immediately begin to mature, thus immediately reflecting heat which would ordinarily cause the deterioration of the laminate. Furthermore, the conductivity of the metal not exposed to the heat would keep the laminate cool until such time as the metallic coating was fully matured and the optimum reflectivity thereof achieved. At this point the laminate receives the maximum protection afforded by the reflectivity of the metallic coating.

Unlike conventional vapor deposition of metals on various types of supporting structures, the resulting product of our process is a fired article wherein the metallic coating has a fusing agent therein such as ceramic frits or the like which, in turn, melt and become an integral part of the laminate itself creating both a mechanical and chemical bond. Furthermore, we have found that the silicone and phenolic laminates are the most effective for extremely high temperatures.

EXAMPLE I

A strip or pre-form of 181-12 woven glass cloth was dip-impregnated to 37% resin including 2% volatiles (based upon the total weight of cloth and resin) with a silicone resin which is commercially obtainable as #DC-2106 having admixed therewith .000003 by weight of a cobalt naphthalate catalyst. Dow Corning #DC-2106 is a standard silicone low pressure, high strength laminating resin which meets military specifications P-25518 and R-25506 and is drawn from the polysiloxane resin group.

Laminating resins of this character are disclosed in United States Letters Patent No. 2,718,483 and any one of the examples disclosed therein may be utilized with equal facility. A typical resin copolymer has the chemical composition of 10 mol percent diphenylsiloxane, 58.5 mol percent monomethylsiloxane, and 31.5 mol percent monophenylsiloxane. Instead of cobalt naphthalate, the resin catalyst may be 0.27 percent trimethyl (beta-hydroxy-ethyl) ammonium 2-ethyl hexoate.

The glass cloth is a smooth finished cloth which has been cleaned and not fired. The impregnated cloth was air-dried to the "B" gel stage. If glass fiber matte is used in place of glass cloth, the resin content is approximately 65% including 2% volatiles. The commercial designation of the glass cloth is 181-12, said designation defining standards of manufacturing and finishing. The 181 designation indicates the weight and thickness thereof and the -12 designation indicates that the glass cloth has a smooth finish, is clean and has not been fired.

Each ply of impregnated cloth was approximately .010 inch in thickness and these "B" stage plies were stacked to attain the desired ultimate thickness of the resulting laminate. After the selected number of plies had been superimposed, one upon the other, they were disposed between press platens coated with a suitable mold release such as Dow Corning #DC-20 which is an emulsion of a dimethylpolysiloxane resin.

The resulting laminate was subjected to a pressure of 175 p.s.i. at a temperature of 325° F., said temperature and pressure being maintained for 25 minutes if the finished thickness of the laminate was ⅛ inch or less. For each additional 0.100 inch over the basic ⅛ inch, an additional 10 minutes at the aforementioned temperature and pressure is required. The press temperature was reduced to 200° F. before pressure was released.

The resulting laminate was removed from the press and placed in an oven, or other suitable means, for a post curing cycle in the following sequence: 8 hours at 200° F., 2 hours at 250° F., 5 hours at 300° F., 5 hours at 350° F., 5 hours at 400° F., 10 hours at 450° F. and 5 hours at 500° F. The finished laminate contains 32%, plus or minus 2%, resin solids.

Immediately prior to the application of the metallic coating, the surface of the laminate to be coated was thoroughly cleaned and air dried to insure that no contaminants were present on the surface of the laminate. This cleaning is normally performed by wiping the surface of the laminate with a clean cloth which has been wetted with toluene, xylene, or other similar highly volatile, hydrocarbon cleaning agent.

The completed laminate was coated with a solution consisting of approximately 7% gold suspended in essential oils such as lavender, turpentine, or the like. The gold is a salt of the metal precipitated into colloidal form and may be purchased commercially from the Hanovia Chemical Company under the designation of "Gold Liquid Bright." Admixed with the essential oils is a small amount of a fusing flux agent constituted by lead borate, ceramic frits, or other similar product.

The gold solution was sprayed upon the surface of the laminate until adequate coverage of the surface with no perceptible voids was obtained. Subsequently to the spraying process, the metal coated laminate was fired by placing its metal coated face parallel to and approximately 2 inches away from a battery of 2 x 8 inch Nichrome strips drawing 1000 watts each and wired in series in a 220 volt circuit. The Nichrome strips are maintained at a controlled temperature of 1200° F. and the firing period for the gold coated laminate was 1 minute.

During the exposure of the gold coating to the heat source, as set forth hereinabove, the fusing flux agent in the gold solution undergoes a combined chemical and mechanical reaction wherein the agent achieves both a mechanical and chemical bond with the juxtaposed surface of the laminate consisting primarily of the polysiloxane resin solids. During subsequent exposure of the gold coated material in temperature shielding applications, the combined chemical and mechanical bond resisted flaking or crazing, or other deterioration of the gold coating and achieved a uniform reflective surface which effectively reflected radiated heat.

EXAMPLE II

Woven glass cloth designated at 181-volan glass cloth was impregnated with a phenolic resin commercially obtainable as Bakelite Corp.'s #BY-17085 and the resulting material was brought to the "B" gel stage by air-drying or the like. 181-volan is a commercial designation for glass cloth, the "volan" indicating that the glass cloth has been dipped in a chrome solution and subsequently baked to dissipate the excess solution and fix the chrome. The chrome solution treatment and the subsequent baking of the treated glass fabric increases adhesion of certain resins with which the fabric is subsequently impregnated.

The impregnation of the glass cloth was accomplished by dip impregnation to 37% resin content including 2% volatiles (based on the total weight of cloth and resin). The Bakelite resin utilized is a phenol formaldehyde laminating resin in a methanol or ethanol alcohol suspension.

Prior to laminating, the "B" stage plies of impregnated fabric were stacked to obtain the desired thickness, each ply being approximately .010 inch in thickness. The press platens were coated with a suitable mold release material such as lecithin, a vegetable oil, or a Carnauba wax compound and the superimposed plies were then placed between the press platens. During the curing process, the press temperature was maintained at 325° F. and the material was successively subjected to the following pressures when the finished laminate is to be ⅛ inch in thickness or under: 30 seconds at 50 p.s.i., 30 seconds at 0 p.s.i., 30 seconds at 100 p.s.i., 30 seconds at 0 p.s.i., 1 minute at 200 p.s.i., 30 seconds at 0 p.s.i., and 25 minutes at 200 p.s.i.

For each additional .100 inch over the basic ⅛ inch, an additional 10 minutes at the aforementioned temperature and final pressure is required. The press temperature was reduced to 200° F. before pressure was released.

After the removal of the laminated product from the press, it was subjected to a post curing cycle by baking, or the like, for the following times and temperatures in sequence: 4 hours at 250° F., 2 hours at 300° F., and 2 hours at 350° F. The finished laminate contained 32%, plus or minus 2%, resin.

Prior to the application of the metallic coating, the surface of the laminate to be coated is cleaned and dried in the same manner as described in the previous example.

After the completion of the post curing cycle and cleaning of the surface of the laminate, one surface of the laminate was coated with a 7% solution of palladium suspended in essential oils such as lavender, turpentine, or the like, the palladium being a salt of the metal precipitated into colloidal form and admixed with the essential oil. Added to the mixture is a small amount of a fusing flux agent such as lead borate, ceramic frits, or the like. The aforesaid metallic coating material may be purchased commercially from the Hanovia Chemical Co. under the designation of "Palladium Liquid Bright #2506."

After the coating was applied on the surface of the laminate by rolling or brushing it thereupon, the metal coated surface was placed parallel to and approximately 2 inches away from the Nichrome battery previously utilized in Example I. The Nichrome strips of the battery were maintained at a controlled temperature of 1000° F. for a firing period of 1 minute. During the firing of the palladium coating, the lead borate or other fusing flux agent forms an intermediate adhesive layer for the metal salt and a chemical and mechanical bond is created with the adjacent surface of the laminate consisting primarily of the phenol formaldehyde resin solids.

Particularly valuable is the corrosion resistance of the coating since prior art insulating batts utilizing aluminum foil as a covering and reflecting surface therefor and polished metal heat reflecting shields have been particularly susceptible to corrosion and oxidation. When oxidation and corrosion of the metallic surfaces in prior art constructions occur, the reflective characteristics thereof are lost and heat is readily transmitted to the object protected, thereby causing premature failure thereof.

In short life destruction tests to determine the thermal conductivity and resistance of the material to exposure to rapidly increasing temperatures, an electrical furnace was used as a high temperature source and the different types of thermally reflective, heat insulating materials were used at the door of the furnace and in substitution therefor. During the tests, the ambient air temperature was approximately 75° F. for the palladium coated sample and approximately 98° F. for the gold coated sample. Test readings were taken at the times and during the periods indicated on the tabulations below. The base materials utilized were glass fiber laminates impregnated with polysiloxane resin.

Presented in the tabulations hereinbelow are the results achieved in the destruction testing of palladium and gold coated samples. In all examples cited in the tables, the total thickness of the material was 1/16 inch with the metallic coating accounting for approximately .0002 inch of the total. The radiated temperature was measured by a thermocouple placed approximately ⅜ inch from the exterior surface of the material being tested.

*Palladium coated sample*

| Radiated Temp., ° F. | Furnace Temp., ° F. | Time in Minutes |
|---|---|---|
| 220 | 720 | 2 |
| 285 | 1,125 | 4 |
| 320 | 1,215 | 6 |
| 320 | 1,265 | 8 |
| 350 | 1,310 | 10 |
| 380 | 1,380 | 12 |
| 395 | 1,435 | 14 |
| 410 | 1,475 | 16 |
| 430 | 1,530 | 18 |
| 460 | 1,575 | 20 |
| 455 | 1,610 | 22 |
| 480 | 1,655 | 24 |
| 500 | 1,715 | 26 |
| 515 | 1,760 | 28 |
| 575 | 1,770 | 29.5 |

*Gold coated sample*

| Radiated Temp., °F. | Furnace Temp., °F. | Time in Minutes |
|---|---|---|
| 98 | 195 | 0 |
| 99 | 338 | 2 |
| 100 | 420 | 4 |
| 105 | 498 | 6 |
| 110 | 579 | 8 |
| 115 | 658 | 10 |
| 121 | 718 | 12 |
| 131 | 845 | 14 |
| 140 | 942 | 16 |
| 150 | 1,010 | 18 |
| 162 | 1,138 | 20 |
| 172 | 1,247 | 22 |
| 191 | 1,373 | 24 |
| 200 | 1,448 | 26 |
| 220 | 1,532 | 28 |
| 238 | 1,720 | 30 |
| 250 | 1,860 | 32 |
| 277 | 1,890 | 34 |
| 284 | 1,910 | 34.5 |

It is, of course, obvious that when the body formed of heat reflecting and insulating material is utilized, the body is mounted with the metallic coating toward the hot surface, and that, normally, a small air space is provided between the device being protected and the interior of the body to permit air circulation therebetween.

We have also discovered that it may be feasible, in some applications, to coat all surfaces of the body with the metallic coating which thus imparts to the plastic impregnated base a greater life/stress factor by sealing said base so as to prevent the atmospheric decomposition thereof.

It is obvious that the maximum temperature at which the heat reflective and insulating material of our invention may be utilized will depend largely upon the type of laminated base plastic used in supporting the metallic coating and the environment in which the material is applied.

For example, in an aircraft, the desired service life of the shield would probably be from 500 to 1000 hours or more of operation, whereas, in a missile, the service life could be on the order of 1 hour. In the aircraft application, the maximum temperature at which the shield is operated would be much lower than that at which the short life missile shield is operated. A gold coated, glass cloth and polysiloxane resin laminate of 1/16 inch thickness has a life expectancy of approximately 6 minutes at a continuous temperature of 1700° F. A similar sample exposed to a temperature of 1600° F. for one hour shows a reduction in flexural strength of approximately 17.5%. A third similar sample has been tested at 1000° F. for 169 hours with no visible signs of deterioration of either the coating or the laminate.

The metallic coating permits any of the plastic bases cited to be utilized without being adversely affected under temperature conditions where the plastic body alone would rapidly deteriorate. The ability to utilize any of these several plastic bases permits a range for selection so that the best monetary economy may be obtained in each individual application commensurate with the service conditions prevalent in that application.

We claim:

1. In a method of fabricating a thermoreflective material, the steps of: impregnating a plurality of laminae of glass fiber cloth with a phenol formaldehyde resin to create a laminate; superimposing said impregnated laminae one upon the other; subjecting said laminate to heat and pressure to attain an article of a desired shape and fully cure said resin; coating a surface of said article with a liquid metalic coating including a soluble salt of a noble metal; and subjecting said coated surface to a temperature in excess of the curing temperature of said resin and in a range of 400–1000° F. to fix and stabilize said metallic coating.

2. In a method of fabricating a thermoreflective material, the steps of: impregnating a plurality of laminae of glass fiber cloth with a phenol formaldehyde resin; superimposing said impregnated laminae one upon the other to create a laminate; subjecting said laminate to heat and pressure to attain an article of a desired shape and fully cure said resin; coating a surface of said article with a liquid metallic coating including a salt of a noble metal in an essential oil vehicle, said vehicle having admixed therewith a fusing substance; and subjecting said coated surface to a temperature in excess of the curing temperature of said resin and in a range of 400–1000° F. to fuse said substance and to fix and stabilize said coating.

3. In a method of fabricating a thermoreflective material, the steps of: impregnating a plurality of laminae of glass fiber cloth with a polysiloxane resin; superimposing said impregnated laminae one upon the other to create a laminate; subjecting said laminate to heat and pressure to attain an article of a desired shape and fully cure said resin; coating a surface of said article with a liquid metallic coating including a soluble salt of a noble metal; and subjecting said coated surface to a temperature in the range of 400–1000° F. to fix and stabilize said metallic coating.

4. In a method of fabricating a thermoreflective material, the steps of: impregnating a plurality of laminae of glass fiber cloth with a polysiloxane resin; superimposing said impregnated laminae one upon the other to create a laminate; subjecting said laminate to heat and pressure to attain an article of a desired shape and fully cure said resin; coating a surface of said article with a liquid coating including a salt of a noble metal in an essential oil vehicle, said vehicle having a fusing substance admixed therewith; and subjecting said coated surface to a temperature in excess of the curing temperature of said resin and in a range of 400–1000° F. to fuse said substance and to fix and stabilize said coating.

5. In a method of fabricating a thermoreflective material, the steps of: impregnating a plurality of laminae of glass fiber cloth with a phenol formaldehyde resin; superimposing said impregnated laminae one upon the other to create a laminate; subjecting said laminate to heat and pressure to attain an article of a desired shape and fully cure said resin; coating a surface of said article with a liquid coating including a salt of a noble metal in an essential oil vehicle, said vehicle having ceramic frits admixed therewith; and subjecting said coated surface to a temperature range of 400–1000° F. to fuse said ceramic frits and to fix and stabilize said coating.

6. In a method of fabricating a thermoreflective material, the steps of: impregnating a plurality of laminae of glass fiber cloth with a thermosetting resin; superimposing said impregnated laminae one upon the other to create a laminate; subjecting said laminate to heat and pressure to attain an article of a desired shape and fully cure said resin; coating a surface of said article with a liquid coating including a salt of a noble metal in an essential oil vehicle, said vehicle having a lead borate fusing flux agent admixed therewith; and subjecting said coated surface to temperatures in a range of 1000° F. to fuse said fusing flux agent and to fix and stabilize said coating.

7. A heat insulating body having a laminated base of glass fiber cloth impregnated with phenol formaldehyde resin upon the surface of which is deposited a reflective coating heat fused on said surface at temperatures in the range of 400–1000° F. and incorporating a metal drawn from the noble metal group and having embodied therein a fusing substance adapted to create a bond between said metal and said surface of said base upon which it is deposited.

8. A heat insulating body having a laminated base of glass fiber cloth impregnated with a polystyrene resin upon the surface of which is deposited a reflective coating heat fused on said surface at temperatures in the range of 400–1000° F. and incorporating a metal drawn from the noble metals group and having embodied therein a fusing substance adapted to create a bond between said metal and said surface of said base upon which it is deposited, said fusing substance being constituted by a ceramic frit incorporated in said coating.

9. A heat insulating body having a laminated base of glass fiber cloth impregnated with phenol formaldehyde resin upon the surface of which is deposited a reflective coating heat fused on said surface at temperatures in the range of 400–1000° F. and incorporating a metal drawn from the noble metals group and having embodied therein a fusing substance adapted to create a bond between said metal and said surface of said base upon which it is deposited, said fusing substance being constituted by lead borate incorporated in said coating.

10. A heat insulating body having a laminated base of glass fiber cloth impregnated with a thermosetting resin upon the surface of which is deposited a reflective coating heat fused on said surface at temperatures in the range of 400–1000° F. and incorporating a metal drawn from the noble metals group and having embodied therein a fusing substance adapted to create a bond between said metal and said surface of said base upon which it is deposited, said fusing substance being constituted by lead borate incorporated in said coating.

References Cited in the file of this patent

UNITED STATES PATENTS

| | | |
|---|---|---|
| 1,809,984 | Mains | June 16, 1931 |
| 2,103,598 | Smith | Dec. 28, 1937 |
| 2,404,904 | Collins | July 30, 1946 |
| 2,439,137 | Keller | Apr. 6, 1948 |
| 2,457,158 | Koch | Dec. 28, 1948 |
| 2,517,777 | Fenn et al. | Aug. 8, 1950 |
| 2,680,699 | Rubin | June 8, 1954 |
| 2,688,576 | Ryan et al. | Sept. 7, 1954 |
| 2,718,483 | Clark | Apr. 20, 1955 |
| 2,724,674 | Pritikin | Nov. 22, 1955 |